United States Patent
Arunkumar et al.

(10) Patent No.: US 10,542,019 B2
(45) Date of Patent: Jan. 21, 2020

(54) PREVENTING INTERSECTION ATTACKS

(71) Applicant: International Business Machines Corporation, Armonk, NY (US)

(72) Inventors: Saritha Arunkumar, Hampshire (GB); Supriyo Chakraborty, Westchester, NY (US); Raghu Kiran Ganti, Elmsford, NY (US); Mudhakar Srivatsa, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 127 days.

(21) Appl. No.: 15/454,675

(22) Filed: Mar. 9, 2017

(65) Prior Publication Data

US 2018/0262519 A1 Sep. 13, 2018

(51) Int. Cl.
*H04L 29/06* (2006.01)
*G06F 21/62* (2013.01)
*G06F 16/29* (2019.01)
*G06F 16/25* (2019.01)

(52) U.S. Cl.
CPC ........ *H04L 63/1416* (2013.01); *G06F 16/258* (2019.01); *G06F 16/29* (2019.01); *G06F 21/6254* (2013.01); *H04L 63/145* (2013.01)

(58) Field of Classification Search
CPC .............. H04L 63/1416; H04L 63/145; G06F 17/30424; G06F 17/30569; G06F 63/145; G06F 17/30241; G06F 21/6254
See application file for complete search history.

(56) References Cited

U.S. PATENT DOCUMENTS

| | | | |
|---|---|---|---|
| 7,269,578 B2 | 9/2007 | Sweeney | |
| 8,121,874 B1 | 2/2012 | Guheen et al. | |
| 9,311,670 B2 | 4/2016 | Hoffberg | |
| 9,348,920 B1 | 5/2016 | Kesin | |
| 9,473,511 B1 | 10/2016 | Arunkumar et al. | |
| 2010/0332459 A1* | 12/2010 | Yanai | G06F 17/30312 707/674 |
| 2011/0292834 A1 | 12/2011 | Agrawal et al. | |
| 2012/0046017 A1* | 2/2012 | Jennings | H04W 4/029 455/414.1 |
| 2012/0047103 A1 | 2/2012 | Marecki et al. | |
| 2014/0364096 A1 | 12/2014 | Agrawal et al. | |

(Continued)

FOREIGN PATENT DOCUMENTS

GB 2534830 A 8/2016

OTHER PUBLICATIONS

Whelan, "Geohash Intro", Dec. 15, 2011, 7 pages (Year: 2011).*

(Continued)

*Primary Examiner* — Chau Le
*Assistant Examiner* — Han Yang
(74) *Attorney, Agent, or Firm* — Kevin M. Jordan, Esq.; McGinn IP Law Group, PLLC

(57) ABSTRACT

A computer-implemented method (and structure) includes receiving information. The received information is converted into a strictly hierarchical data format. A precision for a releasing the strictly hierarchical data is calculated based on privacy protection levels and a reward for different precision levels. The strictly hierarchical data is sequentially released at the calculated precision.

20 Claims, 8 Drawing Sheets

(56) References Cited

U.S. PATENT DOCUMENTS

2016/0285886 A1 9/2016 Arkunkumar et al.
2018/0004978 A1* 1/2018 Hebert .............. G06F 17/30522

OTHER PUBLICATIONS

Ksentini, "A Markov Decision Process-based Service Migration Procedure for Follow Me Cloud", 2014, 5 pages (Year: 2014).*
Veloso, "Markov Systems with Rewards, Markov Decision Processes", 2012, 4 pages (Year: 2012).*
Joon S. Park, "Optimal State Management of Data Sharing in Online Social Network (OSN) Services", 2012 IEEE 11th International Conference on Trust, Security and Privacy in Computing and Communications, 8 pages (Year: 2012).*
Peter Mel, et al., "The NIST Definition of Cloud Computing", IBM Confidential: Attorney Work Product; Nov. 2015, pp. 7-13.
Bugra Gedik, "Protecting Location Privacy with Personalized k-Anonymity: Architecture and Algorithms", IEEE Transactions on Mobile Computing, vol. 7, No. 1, Jan. 2008, pp. 1-18.
Cynthia Dwork, "Differential Privacy", 1977, pp. 1-12.

* cited by examiner

PREVENTING INTERSECTION ATTACKS

BACKGROUND

The present invention relates generally to privacy of information and, more specifically, protecting private information against attack.

SUMMARY

In an exemplary embodiment, the present invention can provide a computer-implemented method including receiving, by a computer, information; converting, by the computer, the information into a strictly hierarchical data format; calculating a precision for a release of the strictly hierarchical data, based on privacy protection levels and a reward for different precision levels; and sequentially releasing the strictly hierarchical data at the calculated precision.

Other exemplary embodiments provide a system and a computer program product that implement this computer-implemented method.

BRIEF DESCRIPTION OF THE DRAWINGS

Aspects of the invention will be better understood from the following detailed description of exemplary embodiments of the invention with reference to the drawings, in which.

DETAILED DESCRIPTION

Figure 1:
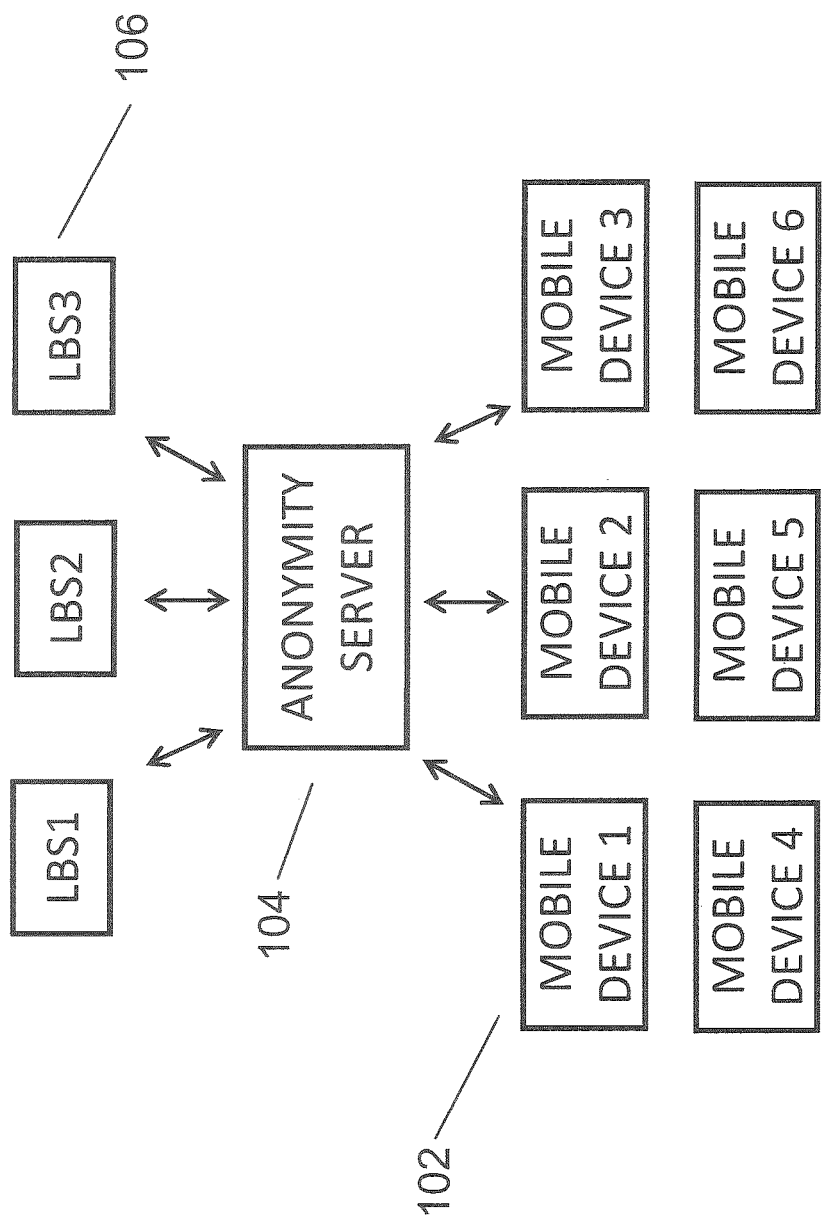
FIG. 1 depicts the present invention in a generic framework with multiple devices and at least one location based service (LBS)

The invention will now be described with reference to FIGS. 1-8. It is initially emphasized that the exemplary data types and data sources described herein are not intended as limiting the present invention and that the exemplary embodiments provided below are for illustration purposes only and are not intended to limit the claims in any way.

For a number of years, mobile devices, such as cell phones, smart phones, and personal digital assistants, have been capable of location tracking, the determination of the position or location of a mobile device, whether stationary or moving. The localization can be based on, for example, triangulation of radio signals between the phone and various cell towers of the network and/or the mobile device may simply determine its location based on receiving signals from at least four satellites of the Global Positioning System (GPS). For the radio signal triangulations, the mobile phone must emit at least the roaming signal to contact a nearby antenna tower, but the process does not require that the mobile phone make an active call.

Mobile positioning technology has evolved to include location-based services (LBS) that disclose the coordinates of a mobile phone. An LBS is a software-level service that uses location data and, as such, provides an information service in a number of possible applications such as, for example, social media, health services, indoor object searches, entertainment, work, and personal life, and has become important to many businesses as well as government organizations. For example, an LBS can provide a service to identify a location of a person during an emergency 911 call or to locate an object relative to a person, such as discovering the nearest banking cash machine (ATM). An LBS might also be used to locate the whereabouts of a friend or employee, for parcel tracking, for vehicle tracking services, for mobile commerce as taking the form of coupons or advertising directed at customers based on their current location, for personalized weather services, for location-based games, etc.

Although LBSs can provide mobile clients a wide variety of services based on location-based information, and businesses can be more competitive in mobile commerce by using LBS, the use of LBSs also provide opportunities for an adversary to abuse location information of mobile clients. For example, an adversary might be able to breach LBS to get access to information that reveal locations visited by individuals and the times of such visit or might be able to use location information to infer details of an individual's private life, such as political affiliations, alternative lifestyle choices, medical problems, or to infer details of private business affairs of an organization, such as new business initiatives and partnerships.

The present invention addresses a specific aspect, referred to herein as "intersection attack", to privacy of information that is made possible by LBS and other methods in which sensitive data is transmitted in serial-time transmissions. Although location information of LBS is used as an example to explain concepts of the present invention, it is noted that such specific information application(s) using location information is not intended as limiting. Rather, the concepts of the present invention could be used for any serial time stream of data that could be vulnerable to intersection attacks on personal/private information, by which intersection attack an adversary might be able to decipher private information by intercepting, aggregating, and correlating successive transmissions. Other non-limiting examples of such serial-time data releases not necessarily involving location data include, for example, health information from an at-home patient, as reported to a health care organization or a medical researcher, data from a user's residence, as used for automatic control of the home's heating/ventilation/air conditioning (HVAC) systems, or information transmissions during various social media applications.

These exemplary data types and data sources are all intended as non-limiting but do demonstrate that the present invention is directed to different data types and data from different types of data sources, including both mobile devices as well as stationary data sources. The term "entity", as used herein, is intended to refer to any type of data source that might be subject to intersection attacks, whether a mobile device, a user's mobile device, a stationary sensor, or any other device providing sensitive data in serial-time transmissions.

By way of overview, the term "intersection attack" in the context of the present invention, refers to information released about an entity (with a persistent/pseudo-persistent identifier at different points in time) and which information is subject to being joined together. While individually each of those releases may be private, the combination of the two may provide sufficient additional information to invade one's privacy.

For instance, consider two location queries that reveals a user's location as "l1" at time t1 and "l2" at time t2 (where l1 and l2 represent so-called spatial cloaks of the original location data). Each of these releases may be private but the "intersection" of these two releases may no longer be sufficiently private, e.g., for one or more entities that were at (l1, @ t1) AND at (l2, @ t2).

The terms "signature data", "time series data" and/or "time series signatures", in the context of the present invention, refers to data, possibly in an encoded format, that is transmitted in a time series manner, whether periodic or non-periodic, and that includes information that is considered sufficiently private so as to warrant that precautions be applied for preserving privacy. The term "longitudinal data" is also used herein as more or less equivalent to "signature data" and is intended to imply data more generic than specific example of location data or any other data type examples exemplarily described herein including data from users' mobile devices.

In the context of the present invention, the term "reward" refers to a value associated with additional precision applied to private/personal information. For example, if the private/personal information is location, then the reward is higher for higher precision location information for first responders during emergency 911 calls, in which the protocol requires a predetermined precision of location data. Similarly, for example, a retailer would consider location data more valuable when the data is sufficiently precise to determine current proximity of a potential customer relative to a specific retail store location. In both cases, there is a greater reward for greater precision of the location data.

The concept of reward is applicable to types of data other than location. By way of example only, reward can be achieved as additional value associated with additional precision with regard to medical information from an at-home patient sending medical data to a care provider or a medical researcher. Thus, it should be clear that, depending upon the type of data and/or application involved, a reward may or may not have an actual and/or explicit monetary value. By way of example only, some applications, such as for first responder 911 calls or remote control of HVAC parameters in a house based on receiving temperature data from sensors in the house, may have little or no commercial value that can reasonably be exploited based on precision. However, even these examples inherently have a non-monetary "reward" value for greater precision in time-series signature transmissions.

With reference now to FIG. 1, location data from mobile devices 102 can be accessed by one or more mobile device applications (not depicted) and/or with regard to one or more different mobile device users 102. An example using location data will be described in more detail below. As is known, mobile devices 102 include processor-based portable user devices, such as cell phones, laptop computer, and/or are associated with a mobile machine (e.g., automobile). Although mobile devices are depicted, it is to be understood that some embodiments of the present invention equally apply to generally "stationary" devices (e.g., sensors associated with a device, an appliance such as a refrigerator or thermostat, to name just a few). In general, location data can be transmitted from a mobile device 102, often in an encoded form to an anonymity server 104 that, in turn, provides decoded location data to one or more location based service (LBS) 106 providers (e.g., LBS applications).

In some (and for exemplary purposes only), the decoded data is provided as cloaked spatio-temporal data. The LBSs 106 can be location-based service providers that provide information to third parties, such as police agencies for location data during 911 calls, or social media applications. In some embodiments, a location-based service could be part of an app installed directly on one or more mobile devices 102 (not depicted).

Some embodiments of the present invention are directed to protecting privacy whenever data, such as location data associated with a device, is transmitted over a time series, potentially permitting a vulnerability to intersection attacks even if conventional privacy protection mechanisms are in place. More generally, some embodiments of the present invention are directed to protect (from interception) sensitive or personal information that might be contained in a time series transmission. Such protection can prevent (among other things) the further derivation of additional information by such processing as intersecting, aggregating, and further analyzing data from different transmissions, which can include multi-dimensional data.

A number of conventional solutions seek to provide location security for LBS, including (without limitation) k-anonymity, l-diversity, t-closeness, randomized IDs, and differential privacy. However, these current solutions (such as k-anonymity, randomized IDs, differential privacy and l-diversity, and t-closeness) do not explicitly consider time series/longitudinal data. Furthermore, they do not directly apply to online/incremental release of data.

Current techniques employing randomization of identifiers may destroy the utility of several applications (e.g., healthcare) and are vulnerable to other kinds of attacks, such as profile matching. When the need is to protect a specific individual's identity and/or other personal information from detection, such as might occur in an intersection attack, conventional methods are lacking.

The present invention addresses these newly recognized concerns by adding a new module on top of the outputs of any or all of these conventional techniques. Accordingly, in the context of the scenario of FIG. 1, the method of the present invention could reside in the same device in FIG. 1 which implements these conventional privacy techniques, for example, the anonymity server 104. Possible relevant conventional privacy techniques are described, as follows.

With k-anonymity, generalized locations (called "spatial cloaks") might be sent back to the requestor. These generalized locations can then used to make requests from a location-based service provider. A release of data is said to have the k-anonymity property if the information for each person contained in the release cannot be distinguished from at least k−1 individuals whose information also appear in the release. An example of the k-anonymity technique is further described in U.S. Pat. No. 7,269,578 to Sweeney. It is noted that temporal cloaking, in which a time point associated with the location point is replaced by a time interval that includes the original time point, can also be implemented as part of a k-anonymity defense.

The l-diversity technique is a step further to k-anonymity, that considers some of the drawbacks from k-anonymity by ensuring that sensitive attributes associated with a k-anonymous set (also referred to as an equivalence class) are sufficiently diverse. This technique is used to preserve privacy in data sets by reducing granularity of the data representation, which is a tradeoff that results in some loss of effectiveness of data in order to gain more privacy.

The t-closeness technique is a step further to the l-diversity technique. The t-closeness technique ensures that the distribution of sensitive attributes in a k-anonymous set (equivalence class) is "close" to the global distribution. Thus, an equivalence class is said to have t-closeness if the distance between the distribution of a sensitive attribute in the class and the distribution of the attribute in the whole table is no more than a threshold t, and a table is said to have t-closeness if all equivalence classes have t-closeness.

Differential privacy aims to provide means to maximize the accuracy of queries from statistical databases while minimizing the chances of identifying its records. Thus, for example, a release of aggregate statistical information about the data in the database may inadvertently reveal some information about individuals whose data is contained in the database. This approach does not apply to releasing "raw/obfuscated" data and is only limited to the release of statistics on the underlying data, but such statistical data might be present in certain LBS applications such as reports of health parameters from an at-home patient to a health care provider.

The randomized ID method frequently changes the identifier associated with an entity. The lack of a persistent identifier for an entity makes it harder for the entity to be tracked for the purposes of an intersection attack. The method of the present invention is orthogonal to the randomized ID method in that the present invention attempts to protect data records for the duration that the identifier is persistent (i.e., the period between changes to the identifier). Keeping a persistent identifier offers higher utility for certain LBS applications. A variant of the randomized ID method is the Chaumian Mix that attempts to randomize the ID within a set of entities in a mix zone.

None of these conventional solutions addresses possible intersection attacks; when the question is about a specific individual's identification, such as occurs in an intersection attack, none of the above conventional methods provides a solution. The present invention provides one solution by calculating a precision for time-series signature data transmissions that takes into account a tradeoff between privacy concerns during intersection attacks and reward for additional precision.

As shown exemplarily in TABLE 1 below, data can include information related to location such as zip code data and/or other types of information such as temperature (TEMP). Subsequent data releases might permit a piecing together of information and a possible identification of the users' ID 1, 2. Note that data in TABLE 2 (e.g., data listed in the ZIP and TEMP the third and fourth columns) have been cloaked to provide more anonymity to users associated with ID data by decreasing the precision of the data. One aspect of the present invention is to selectively provide such "cloaking" as a tradeoff between ensuring privacy and a reward for additional precision.

TABLE 1

| ID | TIME | ZIP | TEMP |
| --- | --- | --- | --- |
| 1 | 1000 | 12345 | 27 |
| 1 | 2000 | 12358 | 28 |
| 1 | 3000 | 12367 | 29 |
| 1 | 4000 | 12368 | 29 |
| 2 | 1000 | 12465 | 30 |
| 2 | 2000 | 12467 | 31 |
| 2 | 3000 | 12478 | 27 |
| 2 | 4000 | 12489 | 34 |

TABLE 2

| ID | TIME | ZIP | TEMP |
| --- | --- | --- | --- |
| 1 | 1000 | 123** | <30 |
| 1 | 2000 | 123** | <30 |
| 1 | 3000 | 123** | <30 |
| 1 | 4000 | 123** | <30 |
| 2 | 1000 | 124** | ≥30 |
| 2 | 2000 | 124** | ≥30 |
| 2 | 3000 | 124** | <30 |
| 2 | 4000 | 124** | ≥30 |

In one sense and in view of the conventional methods described above, the present invention could also be described as providing a method that is built upon conventional techniques, such as the k-anonymity technique for data releases, as additionally providing protection against possible intersection attacks. This additional capability of the present invention is implemented using a technique described below involving a Markov Decision Process (MDP).

Figure 2:
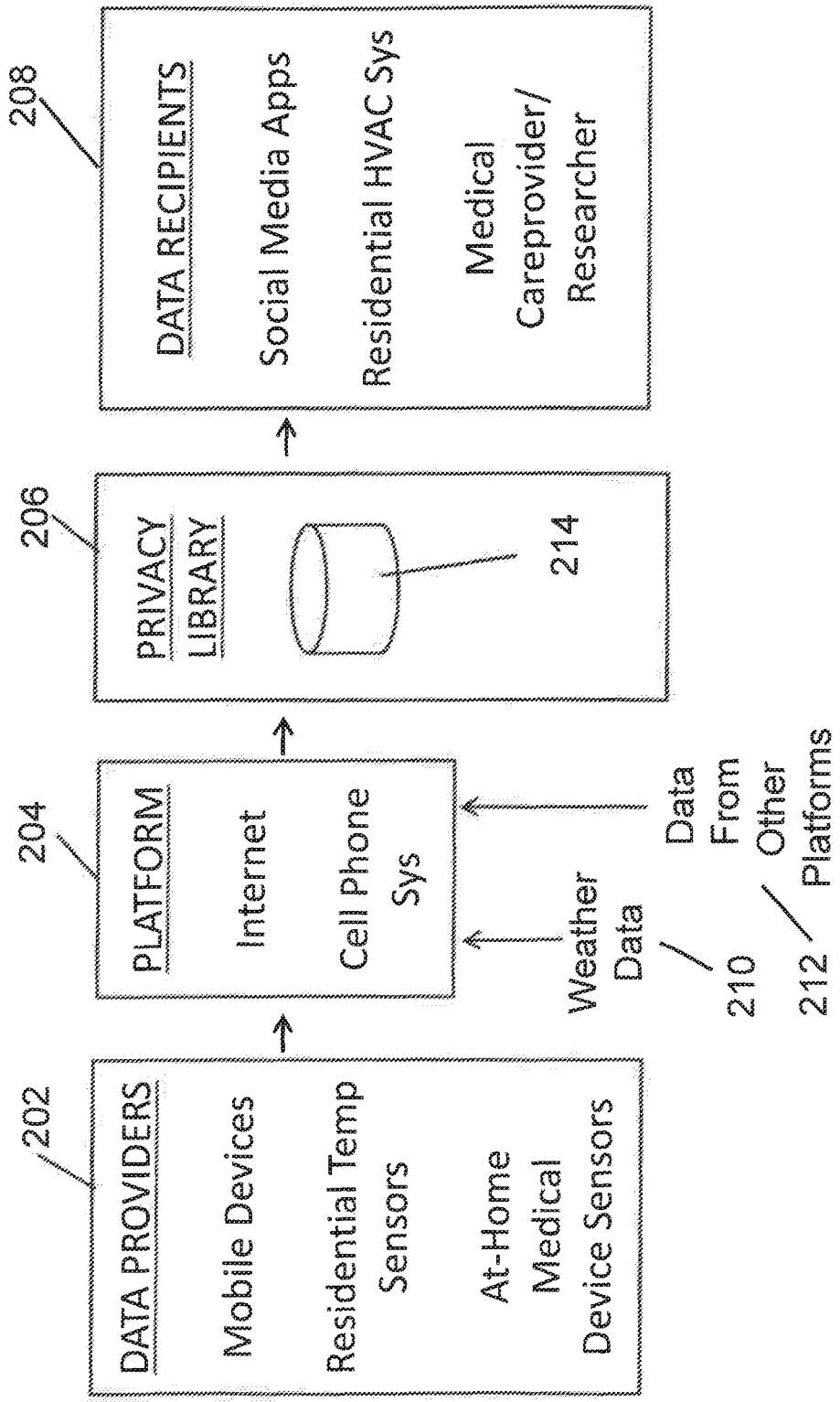
FIG. 2 depicts aspects of an exemplary system in accordance with the present invention.

FIG. 2 depicts multiple data providers 202 that are providing different data streams. For example, mobile devices from various individuals might provide location data for social media applications. Another data source might be sensors in a house for temperatures, to be used in an HVAC (heating/ventilation/air conditioning) application. Another type of data source might be sensors associated with an at-home patient, e.g., as used by a health application in which health data is reported to a remote care provider or a remote researcher remotely monitoring the status of the at-home patient. Data from the data providers 202, is transmitted (e.g., as encoded signature data) to a platform 204 and a privacy library 206. A few examples (without limitation) of possible platforms include a cell phone system, network and/or network of networks, such as the Internet. An example (without limitation) of privacy library 206 is a service, such as an LBS that provides additional privacy protections to provided data. By way of further example (only), privacy library 208 could embody one or more features of the present invention as a processor-executable application stored in a memory device. In such an example, execution of the application can cause the processor to perform one or more aspects of the present invention. Exemplary methods in accordance with the present invention will be discussed below. In some embodiments, such inventive aspects are in addition to one or more conventional privacy methods, such as the k-anonymity, l-diversity, t-closeness, randomized IDs, and/or differential methods.

FIG. 2 depicts multiple data providers 202 that are providing different data streams. For example, mobile devices from various individuals might provide location data for social media applications. Another data source might be sensors in a house for temperatures, to be used in an HVAC (heating/ventilation/air conditioning) application. Another type of data source might be sensors associated with an at-home patient, e.g., as used by a health application in which health data is reported to a remote care provider or a remote researcher remotely monitoring the status of the at-home patient. Data from the data providers 202, is transmitted (e.g., as encoded signature data) to a platform 204 and a privacy library 206. A few examples (without limitation) of possible platforms include a cell phone system, network and/or network of networks, such as the Internet. An example (without limitation) of privacy library 206 is a service, such as an LBS that provides additional privacy protections to provided data. By way of further example (only), privacy library 206 could embody one or more features of the present invention as a processor-executable application stored in a memory device. In such an example, execution of the application can cause the processor to perform one or more aspects of the present invention. Exemplary methods in accordance with the present invention will be discussed below. In some embodiments, such inventive aspects are in addition to one or more conventional privacy methods, such as the k-anonymity, l-diversity, t-closeness, randomized IDs, and/or differential methods.

Figure 3:
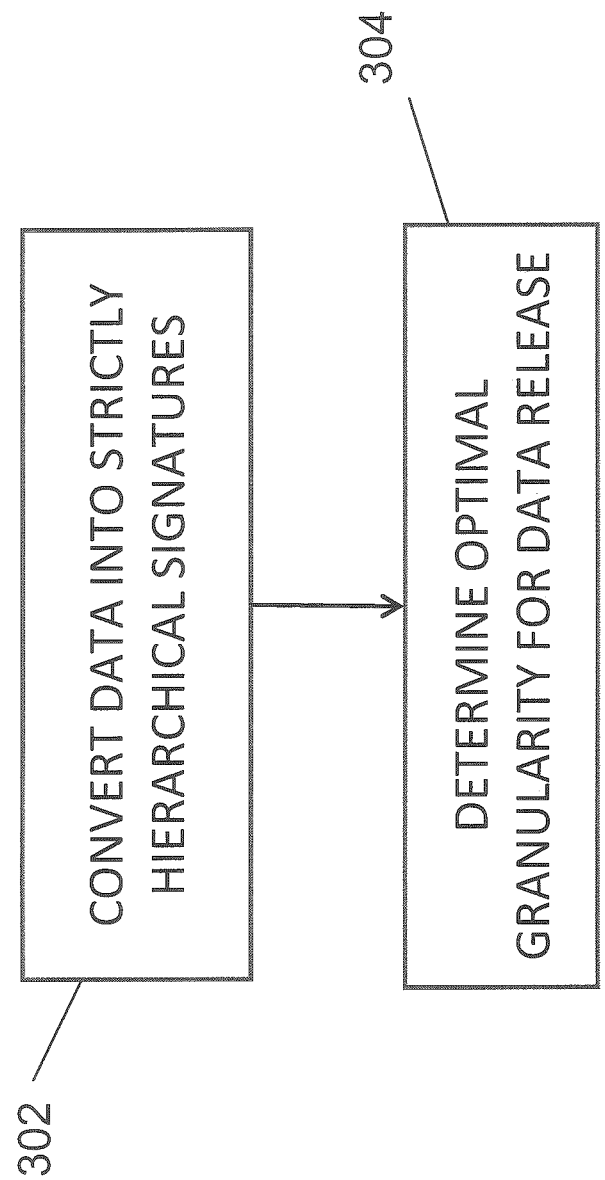
FIG. 3 depicts an exemplary method in accordance with an embodiment of the present invention.

FIG. 3 shows in flowchart format, the method of an exemplary embodiment of the present invention. As depicted, in step 302, location data is converted into a strictly hierarchical format, which, in this example method of the present invention, means that, given any two signatures A and B then exactly one of the following holds:

1. A is equal to B
2. A is strictly contained inside B
3. B is strictly contained inside A
4. A and B are completely disjoint Such strictly hierarchical model disallows partial overlaps between two signatures. In both the offline and the online data release problems, this makes it easy to quantify intersections between two signatures, and, in particular, given any two signatures A,B, the intersection of (A, B) is either A or B or null, which is to say that A∩B=∅ or A∩B=A or B. In a Markov Decision Process (MDP)-based approach of the present invention, this beneficially limits the system to a single state, as opposed to a juxtaposition of multiple states such as would happen if partial overlap between signatures were permitted.

In one exemplary embodiment location data can be converted into strictly hierarchical signatures using geohashing techniques that can provide a strictly hierarchical partition of a space, which guarantees the properties listed above. Another example of location data that has been converted into strictly hierarchical signatures is the ZIP data of TABLE 2 showing zip codes with two wildcard characters, and the TEMP data as defined using temperature intervals.

Although the concept of strictly hierarchical relationships is known in the art, the present inventors are not aware that this concept has been utilized in the context of privacy concerns for data transmissions, let alone the specific application of intersection attacks of serial transmissions of data containing private information.

Likewise, although geohashing is already known as one possible mechanism for achieving strictly hierarchical signatures for location data, it has not been used as in the present invention as a part of a mechanism to provide automatic tradeoff between privacy and precision of transmitted data. A geohash is a hashing of latitude and longitude into numbers/letters, as shown below. By comparing location signatures A and B below, it should be clear that a geohash could be extended until it defines a specific point, or it can be arbitrarily truncated to provide any desired precision.

A: −25.382708, −49.265506→6gkzwgjzn820
B: −25.3827, −49.2655→6gkzwgjzn

From the above example of geohashing, it can be seen that the lat/long coordinates of an entity can describe an exact point in space, or can be generalized to show an area, region, city, state, country, etc. In other words, geohashing can provide an arbitrary amount of precision for a current location, and simple truncation permits a reduction of the precision of location data.

Similarly, a time component of time/location data can be represented at an arbitrary granularity level, for example, seconds, minutes, hours, day, week, month, year, and so on. Another example might involve using time interval data, or an indication of whether a time is before/after a specifically identified time. Similarly, temperature data might be formatted as an interval or as higher/lower than a specific temperature. Health data could be expressed as interval ranges or as being greater than or less than a specific value, and heath conditions could be expressed as conditions with broader categories defining diseases more and more generically. It should be clear that other types of data would have similar formats that could represent data in a strictly hierarchical data format.

For the online/incremental release, in view of the concerns underlying the present invention, a challenge addressed by some embodiments of the present invention is to anticipate what signature should be generated for an entity in the future. The present inventors have recognized that protection against intersection attacks of time/location data can be achieved by providing an automatic tradeoff mechanism between revealing more precise (yet sufficiently private) information now and reaping a higher reward (reward is typically higher when information is more precise), while sacrificing future rewards since privacy requirements may mandate future information releases to be highly imprecise.

Thus, for example, in the model shown in FIG. 2, a retail store wishing to present coupons via a mobile device to persons passing near the store might be willing to pay a reward of x dollars if the location data is sufficiently precise to indicate that an individual is within a few feet of the store entrance but might be willing to pay only ½ x or ¼ x dollars if the location data is less precise. This example demonstrates that, by using the privacy library 206, the present invention would be able to determine when higher rewards are obtainable when specific individuals are located in specified locations so that a specific application could temporarily provide more precision without unduly jeopardizing privacy over time. In an exemplary embodiment, the privacy library 206 could include a listing of applications and locations that would implement such temporary specialized exception processing into the present invention.

To address this challenge for time/location data releases to third parties, the present invention casts the release problem into an MDP (Markov Decision Process) to model myopic (instantaneous) reward and future discounted reward, with the goal of balancing the two. Thus, a second step 304 of the method exemplarily shown in FIG. 3 of the present invention is to implement MDP as a model for determining an optimal granularity for information releases, with a goal to maximize profit while still maintaining privacy of the time/location data.

Thus, in step 304, the trajectory of an entity is modeled as an MDP. For location data scenarios, the states in this MDP might be geohashes, and transitions can capture the movement of this entity. The action that can be taken at any step can consider the choice of granularity of the geohash (e.g., point, small region, city, state, country, etc.). The actions available at any time can also take into account one or more conventional methods for security, such as k-anonymity, l-diversity, t-closeness, etc. The reward at any state can depend upon the granularity of released information—e.g., the reward function can be convex with respect to the granularity of information released.

In some MDP model embodiments e.g., such as are exemplarily illustrated back in FIG. 2, it should be clear that the more precise the information release contains, the higher is the reward, until, of course, the privacy constraint is violated. Beyond this stage, more precise information will result is higher and higher penalty for violating the privacy constraint.

The present inventors have recognized that MDP is one mechanism that can be used to optimize the tradeoff between reward and privacy protection, including the possibility of providing temporary periods of higher precision for specific applications. By way of example only, any MDP processing approach, such as the standard value iteration approach, which is well known in the art for persons familiar with the MDP technique, can be used to solve for an optimal discounted reward and thus determine the optimal choice of granularity of information release.

The Markov Decision Process uses a discrete time stochastic control process. In general, MDP is based upon a finite set S of states s, a finite set A of possible actions at each state, probabilities $P_a(s,s')$ that action a at time t will result in a state transition from state s to state s' at time t+1, expected immediate rewards $R_a(s,s')$ resulting from transitioning from state s to state s' due to action a, and $\gamma \in [0,1]$ as a discount factor which represents the difference in importance between present rewards and future rewards.

The parameter Pa of an MDP denotes state transition probabilities. States are different possible signature precisions, i.e., encoding of user location data at a certain level of spatial granularity. The parameter $\gamma$ denotes a tunable MDP parameter that trades off immediate reward with future reward. For instance, releasing current location at very high granularity results may yield an instantaneous reward. However, due to intersection attacks, future release of locations may be constrained (i.e., they may have to be very low granularity), and thus result in poor reward. Smaller values of $\gamma$ favors the immediate reward in favor of future rewards, while larger values of $\gamma$ (close to one) places equal weights on immediate and future rewards. Typically, in the context of the present invention, the value of $\gamma$ is set between 0.95-0.99.

As applied to the intersection attack problem of the present invention, at each time step t, the process is in some state s, and the decision maker (in the case of the present invention, the "decision maker" is the MDP module that determines the degree of precision of one or more variables in the signature transmissions) may choose any action a that is available in state s. The process responds at the next time step t+1 by randomly moving into a new state $s'=s_{t+1}$, and giving the decision maker a corresponding reward $R_t$. In one exemplary embodiment, for each scenario involving privacy and potential rewards, a "Bellman equation" is defined for that specific environment in the form of a maximization process. The process is then solved at each step t iteratively using linear programming or dynamic programming to maximize the utility function for $R_t$ of the Bellman equation as the MDP is set up for the specific intersection intercept problem:

$$V_{i+1}(s) := \max_a \left\{ \sum_{s'} P_a(s,s')(R_a(s,s') + \gamma V_i(s')) \right\},$$

where V is the value function, i is the iteration number (at time t), a is an action from a possible set of actions, s is the current state, s' is the state at time t+1, $P_a$ is the probability that action a in state s will lead to state s' at time t+1, $R_a$ is the expected immediate reward to be received in transitioning to state s' from state s using action a, and $\gamma$ is a discount factor that represents the difference in importance between the present reward and future rewards and is typically close to 1 (i.e., $0 \leq \gamma < 1$).

Figure 4:
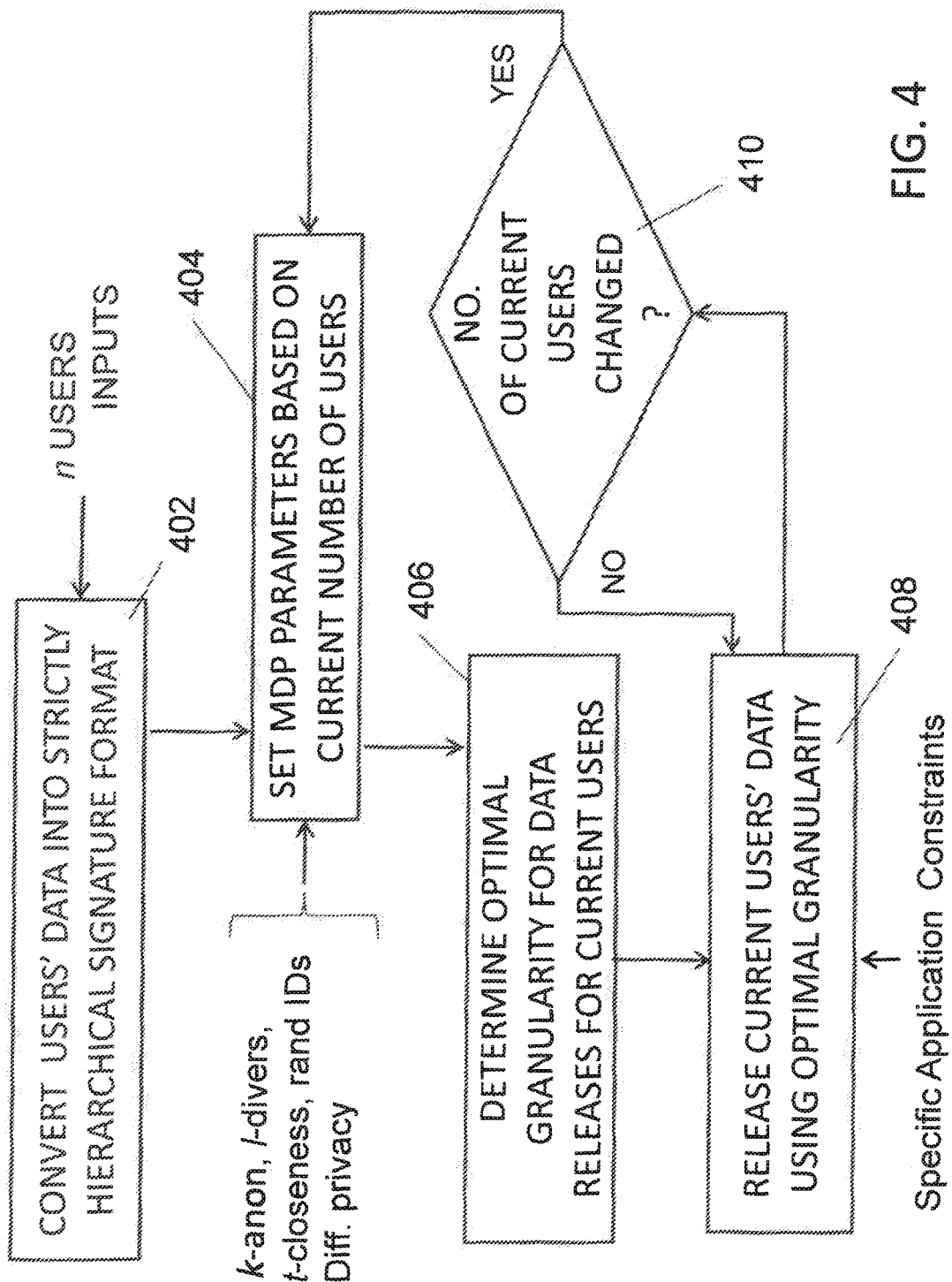
FIG. 4 depicts another exemplary method in accordance with an embodiment of the present invention.

FIG. 4 shows an exemplary embodiment that implements the method of the present invention in a real world scenario using one or more LBSs involving multiple entity inputs which are converted into strictly hierarchical format in step 402. In step 404, MDP processing parameters are set, based on the current set of n users and taking into account any corresponding LBS conventional methods (e.g., k-anonymity, l-diversity, etc.) that might be used for these LBSs. In step 406 the MDP calculates an optimal granularity for data releases in step 408 for all of the n current users. It is noted that, in this exemplary embodiment, step 408 includes an input, for example, from the privacy library 206 in FIG. 2, that selectively permits an override for the MDP calculations for data transmissions of specific individuals for specific applications. These specific constraints might also be an input into the MDP processing of step 406. For example, in a 911 call, precision of serial data transmissions for a specific user is set by a protocol for such calls, permitting first responders to locate a data source within a small area predefined in that protocol. Thus, the 911 protocol would provide a constraint and exempt a specific caller from the signature granularity calculated by the MDP processing for the current inputs from n sources.

In step 410, it is determined whether the number of current users has changed. If there is no change (e.g., "NO") in the number of current users, then the system can continue to release user data at the current level of granularity calculated by the MDP. If the number of current users has changed (e.g., "YES"), then the MDP adjusts its parameters based on the update for the value n and the revised MDP calculation for optimal granularity is used for data releases until the number of users again changes. For example, one factor in setting the probabilities Pa of the MDP processing can reflect the probability that the number of users would change before the system can detect such change in number of current inputs and is able to modify parameters for the LBS conventional methods and the MDP processing.

Further, it is noted again that the exemplary embodiment of the present invention shown in FIG. 4 can include conventional privacy mechanisms, but adds a mechanism that provides protection against intersection attacks. To provide this additional mechanism, the present invention makes an unconventional utilization of two mechanisms shown in FIG. 3, the conversion of data into strictly hierarchical data format, and the use of MDP to calculate a precision based on a tradeoff between privacy and reward. Accordingly, the present invention clearly provides an improvement over conventional privacy mechanisms and achieves this benefit by using two mechanisms in a manner that is unconventional.

Figure 5:
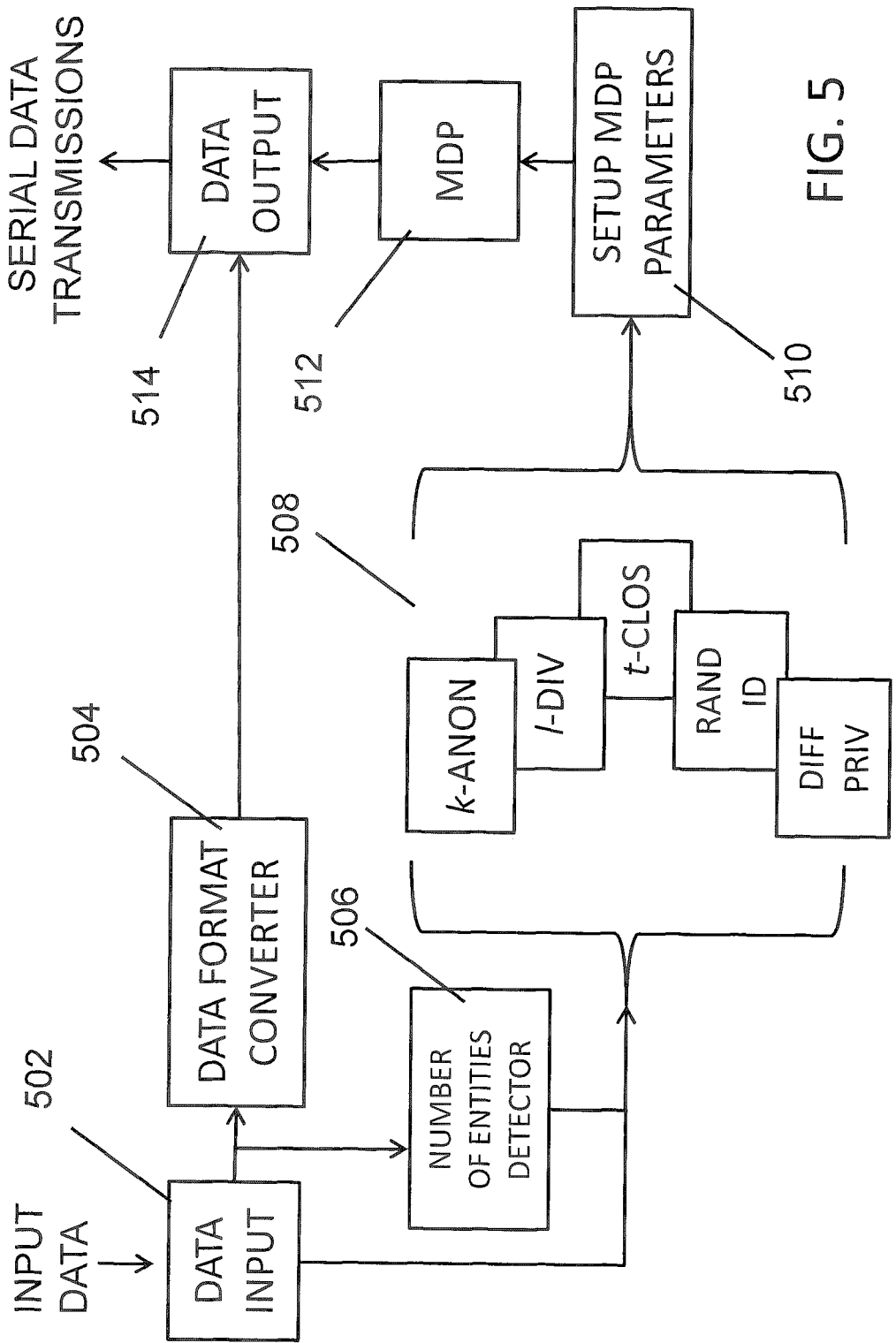
FIG. 5 depicts an exemplary block diagram of components for implementing a method of the present invention.

FIG. 5 shows in block diagram format the components of an exemplary embodiment of the present invention. It is noted that these modules would typically be implemented by or controlled by software executing on a computer. DATA INPUT module 502 receives data from current users and provides such input data into FORMAT CONVERTER module 504 that will convert the input data in an appropriate strictly hierarchical signature format, depending upon each type of input data. Input data is also received by the NUMBER OF ENTITIES DETECTOR module 506, which detects the number of current entities providing data for the different data types. One or more conventional privacy modules 508 provide data to the MDP PARAMETER SETUP module 510. MDP module 512 calculates the precision to be used for output data in strictly hierarchical signature format and provides this precision to the DATA OUTPUT module 514 which provides the serial data transmissions as user input data protected against intersection attack.

Exemplary Hardware Aspects, Using a Cloud Computing Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
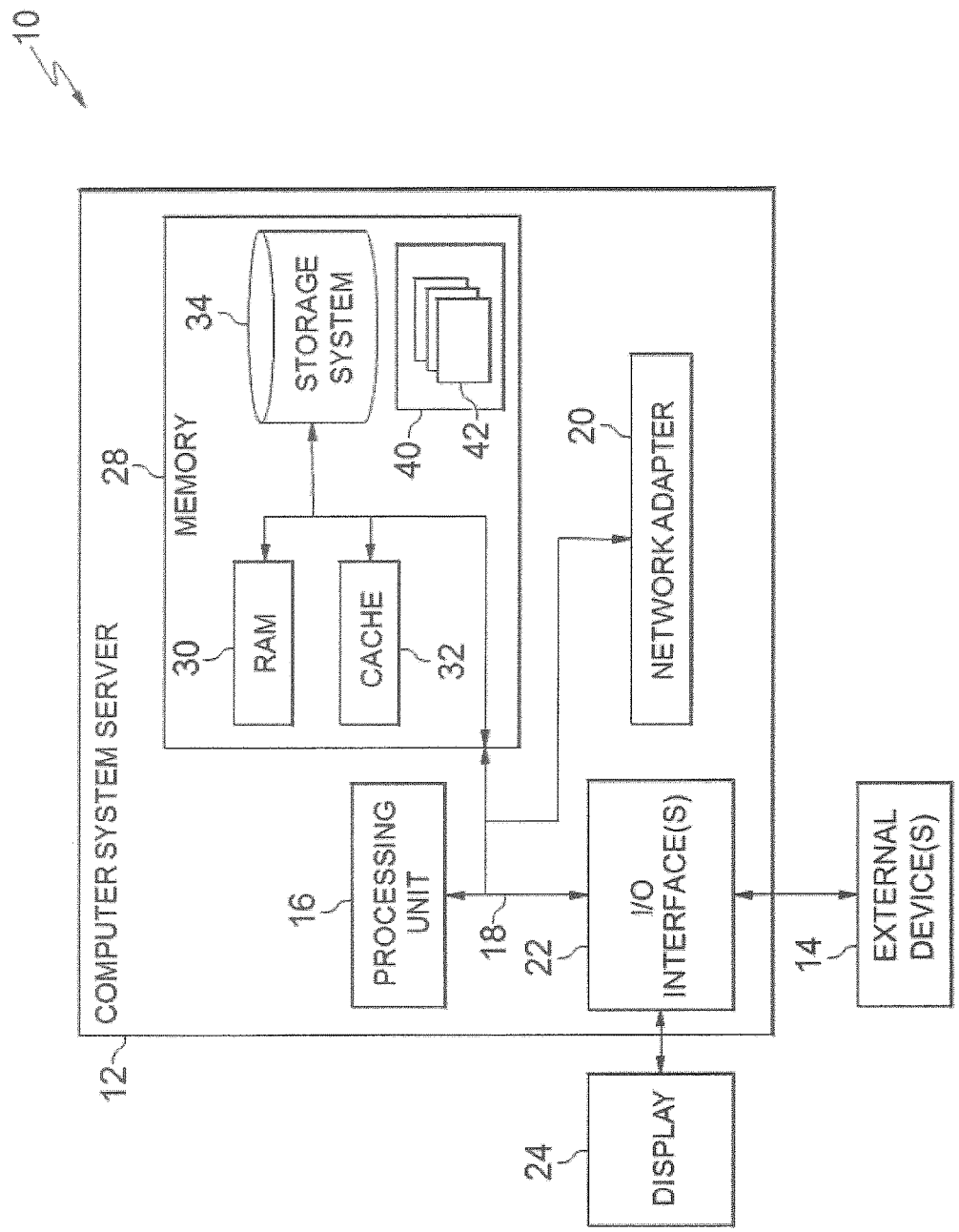
FIG. 6 depicts a cloud computing node according to an embodiment of the present invention.

Referring now to FIG. 6, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external device(s) 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 7:
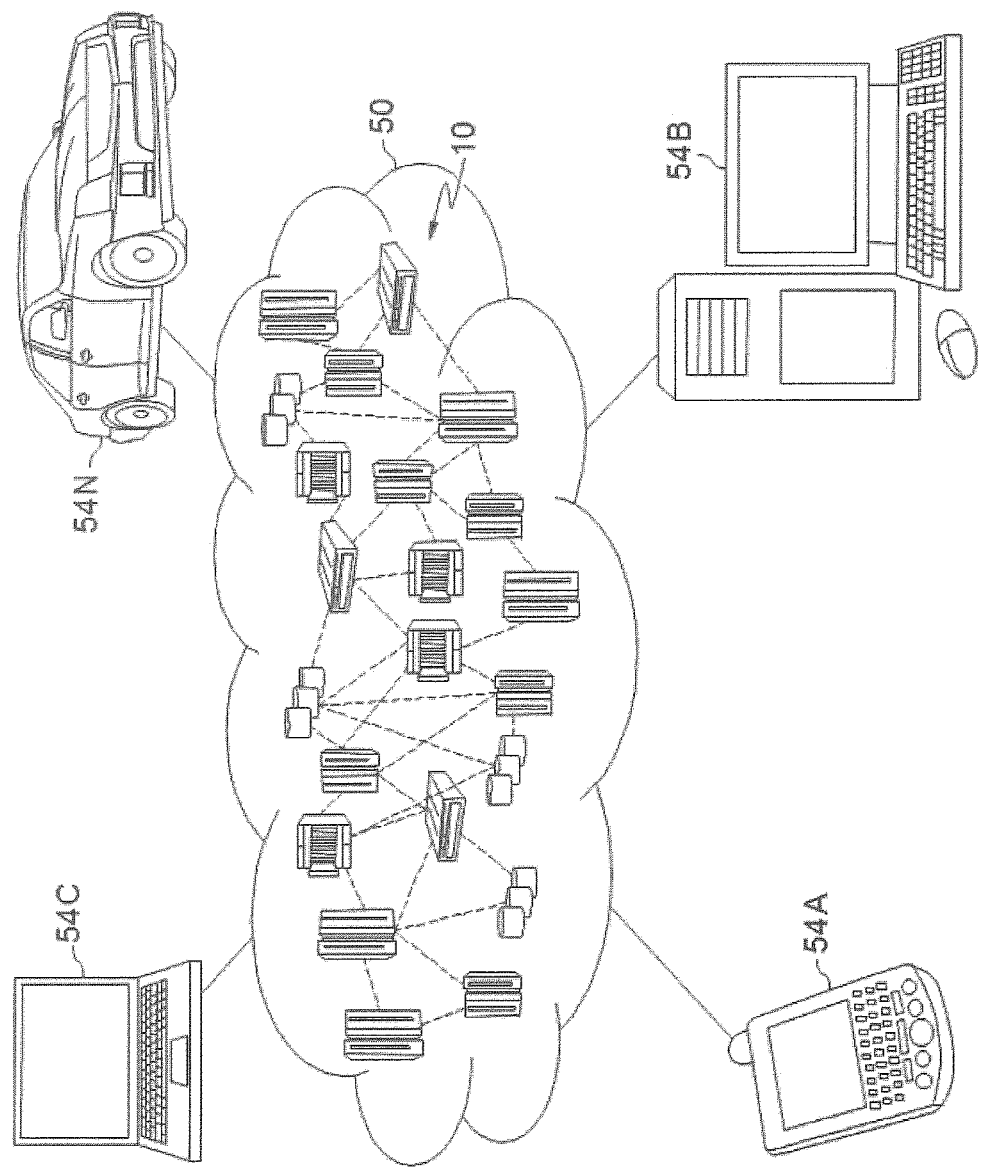
FIG. 7 depicts a cloud computing environment according to an embodiment of the present invention.

Referring now to FIG. 7, an illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
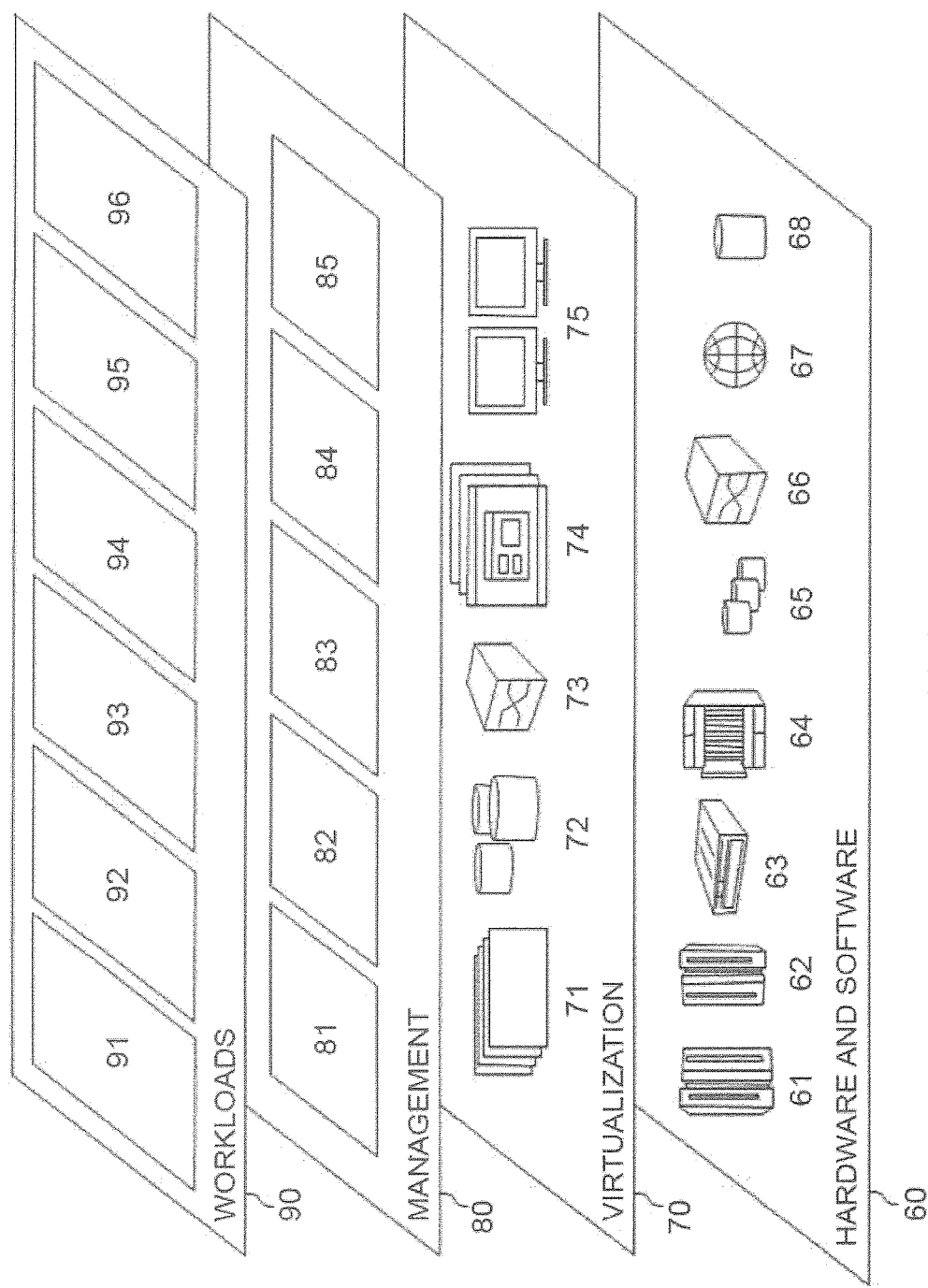
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the intersection attack process 96 of the present invention, including components shown exemplarily in FIG. 5 that implement the methods shown exemplarily in FIG. 3 and FIG. 4.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicants' intent is to encompass the equivalents of all claim elements, and no amendment to any claim of the present application should be construed as a disclaimer of any interest in or right to an equivalent of any element or feature of the amended claim.

What is claimed is:

1. A computer-implemented method for protecting sensitive data against intersection attacks, the method comprising:
   receiving, by a computer, information to be transmitted in a serial-time transmission;
   converting, by the computer, the information into a strictly hierarchical data format;
   calculating a precision for releasing the strictly hierarchical data, based on privacy protection levels and a reward for different precision levels; and
   sequentially releasing the strictly hierarchical data at the calculated precision in a time series transmission,
   wherein the calculating of precision uses a Markov Decision Processing (MDP) process implementing a discounted reward model that incorporates the privacy protection levels and which applies a privacy protection level appropriate for a purpose of the serial-time transmissions while maximizing a utility function for the reward based on a granularity of precision in a release, in view of the appropriate privacy protection level, a current number of users, and a probability of changes in the current number of users.

2. The method of claim 1, wherein said strictly hierarchical data format disallows partial overlaps between two data signatures, meaning that, given any two data signatures A,B, the intersection of (A, B) is either A or B or null (A∩B=Ø or A∩B=A or B).

3. The method of claim 1, wherein the strictly hierarchical data format is defined as meaning, given any two data signatures A and B, then exactly one of the following holds:
   A is equal to B;
   A is strictly contained inside B;
   B is strictly contained inside A; and
   A and B are completely disjoint.

4. The method of claim 1, wherein the information comprises location data.

5. The method of claim 4, wherein said converting comprises converting the location data using a geohashing technique.

6. The method of claim 1, wherein the information originates from a mobile device.

7. The method of claim 1, wherein the information originates from a stationary data source.

8. The method of claim 1, wherein said receiving information comprises receiving information from multiple entities, the method further comprising:
   receiving values from one or more privacy modules as reflecting inputs from the multiple entities; and
   adapting one or more parameters associated with said calculating of precision,
   wherein said calculating of precision is thereby performed for the multiple entities without having to calculate a precision for each entity or for each data release.

9. The method of claim 8, further comprising:
   detecting a number n of entities in an area reporting said information as time-series information to receive protection by said privacy modules as a group of entities reporting said information; and
   updating said one or more parameters associated with said calculating of precision, in response to changes detected to said number n of entities.

10. The method of claim 1, further comprising providing a capability for at least a temporary override for the calculated precision for at least one of a specific application and a specific individual.

11. A system, comprising:
   a computer having at least one processor; and
   at least one memory device accessible by said at least one processor,
   wherein said memory device stores a set of computer-readable instructions that, when executed by the processor, causes:
      receiving, by the computer, information as a time series;
      converting, by the computer, the information into a strictly hierarchical data format;
      calculating a precision for a release of the strictly hierarchical data, based on privacy protection levels and a reward for different precision levels; and
      sequentially releasing the strictly hierarchical data at the calculated precision in a time-series transmission,
   wherein the calculating of precision uses a Markov Decision Processing (MDP) process implementing a discounted reward model that incorporates the privacy protection levels and which maximizes a utility function for the reward based on a granularity of precision in a release, in view of the privacy protection levels, a current number of users, and a probability of changes in the current number of users.

12. The system of claim 11, wherein the information comprises location data.

13. The system of claim 12, wherein said converting comprises converting the location data using a geohashing technique.

14. The system of claim 11, wherein said receiving information comprises receiving information from multiple entities, and the set of computer-readable instructions further causing:
   receiving values from one or more privacy modules as reflecting inputs from the multiple entities; and
   adapting one or more parameters associated with said calculating of precision, wherein said calculating of precision is thereby performed for the multiple entities without having to determine a precision for each entity or for each data release.

15. The system of claim 14, the set of computer-readable instructions further causing:

detecting a number n of entities in an area reporting said information as time series to receive protection by said privacy modules as a group of entities reporting said information; and updating said one or more parameters associated with said calculating of precision, in response to changes detected to said number n of entities.

16. The system of claim 15, the set of computer-readable instructions further providing a capability for at least a temporary override for the calculated precision for at least one of a specific application and a specific individual.

17. The system of claim 11, wherein software is provided as a service in a cloud environment.

18. A computer program product for protecting private information against attack, the computer program product comprising a computer readable storage medium having program instructions embodied therewith, the program instructions executable by a computer to cause the computer to implement the method of claim 1.

19. A computer-implemented method for protecting sensitive data against intersection attacks, the method comprising:

receiving input data from n users as sensitive data to be transmitted in serial time transmissions;

converting, by a processor on a computer, the information into a strictly hierarchical data format;

setting parameters of a Markov Decision Processing (MDP) process based on a current number of users providing data to be transmitted, the MDP process implementing a discounted reward model that incorporates the privacy protection levels and which maximizes a utility function for the reward based on a granularity of precision in a release, in view of the privacy protection levels, a current number of users, and a probability of changes in the current number of users, exercising the MDP process to calculate a precision for a release of sensitive data; and providing the sensitive data at the calculated precision to a location based service for transmission of the sensitive data in serial time transmissions in a privacy protection format used by the location based service.

20. The computer-implemented method of claim 19, wherein the location based service uses a privacy protection format from a plurality of privacy protection formats comprising at least: k-anonymity, l-diversity, t-closeness, randomized IDs, and differential privacy.

* * * * *